United States Patent
Sheng et al.

(10) Patent No.: US 11,068,643 B2
(45) Date of Patent: Jul. 20, 2021

(54) CLIENT-SIDE CUSTOMIZATION AND RENDERING OF WEB CONTENT

(71) Applicant: Oracle International Corporation, Redwood Shores, CA (US)

(72) Inventors: Bin Sheng, Beijing (CN); Mofeng Ma, Beijing (CN)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 16/271,314

(22) Filed: Feb. 8, 2019

(65) Prior Publication Data
US 2020/0257756 A1    Aug. 13, 2020

(51) Int. Cl.
  *G06F 17/00* (2019.01)
  *G06F 40/154* (2020.01)
  *G06F 40/197* (2020.01)
  *G06F 40/14* (2020.01)

(52) U.S. Cl.
  CPC ............ *G06F 40/154* (2020.01); *G06F 40/14* (2020.01); *G06F 40/197* (2020.01)

(58) Field of Classification Search
  CPC ...... G06F 40/154; G06F 40/197; G06F 40/14; G06F 16/986; G06F 16/958; G06F 40/131; G06F 40/143
  USPC ........................................................ 715/236
  See application file for complete search history.

(56) References Cited

U.S. PATENT DOCUMENTS

| | | | |
|---|---|---|---|
| 6,438,578 B1 * | 8/2002 | Schmid | H04L 67/20 709/203 |
| 7,975,019 B1 * | 7/2011 | Green | G06Q 30/0241 709/217 |
| 8,621,341 B2 | 12/2013 | Kern et al. | |

(Continued)

FOREIGN PATENT DOCUMENTS

| | | |
|---|---|---|
| CN | 104267941 B | 1/2018 |
| WO | 2011067531 | 6/2011 |
| WO | 2015020853 A1 | 2/2015 |

OTHER PUBLICATIONS

Farris; Frank, "How to Convert a Non-Responsive Website into a Responsive Website", Deepblue, Oct. 26, 2014, retrieved from http://www.deepblue.com/blog/2014/10/26/how-to-convert-a-non-responsive-website-into-a-responsive-website/, 3 pages.

(Continued)

*Primary Examiner* — Jason T Edwards
(74) *Attorney, Agent, or Firm* — Kilpatrick Townsend & Stockion LLP

(57) ABSTRACT

Techniques described herein relate to generating updated style sheets and/or other web content by a client web browser to allow for specific formatting, layouts, and styles to be applied to particular web elements when rendered at the client device. A client device may analyze the web content received from a web server to identify individual elements within the web content, including element identifiers, values, and/or other properties. The client device may transmit subsequent requests to the web server to retrieve element definitions, use the element definition to dynamically generate updated web content, and then inject the updated web content into the web content received from the web server to implement a customized and element-specific display format, layout, and style at the client device.

20 Claims, 8 Drawing Sheets

(56) References Cited

U.S. PATENT DOCUMENTS

| | | | |
|---|---|---|---|
| 8,682,964 B1* | 3/2014 | Brundage | H04L 67/02 709/203 |
| 9,003,313 B1 | 4/2015 | Cierniak | |
| 9,087,024 B1* | 7/2015 | Hayden | G06F 3/0481 |
| 9,311,420 B2 | 4/2016 | Da Palma et al. | |
| 9,697,190 B2 | 7/2017 | Baldwin et al. | |
| 9,857,959 B2 | 1/2018 | Dhawal | |
| 2002/0032701 A1* | 3/2002 | Gao | H04L 67/02 715/240 |
| 2004/0109197 A1* | 6/2004 | Gardaz | G06T 3/4092 358/1.15 |
| 2006/0041681 A1* | 2/2006 | Rumelhart | H04L 67/1002 709/238 |
| 2007/0033293 A1* | 2/2007 | Rumelhart | H04L 67/306 709/238 |
| 2007/0073707 A1* | 3/2007 | Rychener | G06F 16/972 |
| 2007/0220480 A1 | 9/2007 | Waldman et al. | |
| 2009/0300483 A1 | 12/2009 | Viet | |
| 2012/0210205 A1* | 8/2012 | Sherwood | H04N 21/43615 715/234 |
| 2012/0303697 A1* | 11/2012 | Alstad | G06F 16/9574 709/203 |
| 2014/0095329 A1* | 4/2014 | Liu | G06Q 30/0277 705/14.73 |
| 2014/0207911 A1* | 7/2014 | Kosmach | H04L 65/1083 709/218 |
| 2014/0310599 A1* | 10/2014 | Clift | H04N 21/4227 715/719 |
| 2015/0082214 A1 | 3/2015 | Roessler et al. | |
| 2015/0154660 A1* | 6/2015 | Weald | H04L 67/42 705/14.73 |
| 2015/0278388 A1 | 10/2015 | Markov et al. | |
| 2015/0317405 A1* | 11/2015 | Manchester | G06F 16/958 715/234 |
| 2017/0046037 A1* | 2/2017 | Dand | G06F 3/04842 |
| 2019/0238559 A1* | 8/2019 | Paradis | H04L 67/145 |

OTHER PUBLICATIONS

Gupta; Nishant, "Convert an Existing Non-Responsive Website to Responsive One", DZone Web Development, Jan. 17, 2016, retrieved from https://dzone.com/articles/convert-an-existing-non-responsive-website-to-resp, 18 pages.

"Responsive Web Design", Google Developers, Sep. 27, 2017, retrieved from https://developers.google.com/search/mobile-sites/mobile-seo/responsive-design, 6 pages.

European Application No. EP20155492.0, Extended European Search Report dated Jun. 26, 2020, 8 pages.

* cited by examiner

CLIENT-SIDE CUSTOMIZATION AND RENDERING OF WEB CONTENT

BACKGROUND OF THE INVENTION

Web servers provide content to client devices by transmitting HTTP (Hypertext Transfer Protocol) message and/or a variety of web-based protocols to serve web files to their various clients. Client devices generally transmit requests through their web browsers, and then receive web pages from web servers in the form of markup language documents such as Hypertext Markup Language (HTML) files, Extensible Markup Language (XML) files, and associated web-based resources such as JavaScript files, style sheets (e.g., CSS), along with image files, video files, and other web content to be embedded within the web page. The web browser on the client device may then parse the markup language documents received from the web server, and render the web page content to the display of the client device. The web browser displays the elements by applying layout rules and using particular rendering styles of the elements defined by the style sheets.

With the increasing numbers and types of client devices, including desktop computers, laptop computers, tablets, smartphones, smart watches, web-enabled televisions, and the like, it is important for web content to be rendered differently depending on the type and characteristics of the client device. To that end, web servers generally create multiple copies of web pages/web content to be rendered on different client devices. When a client requests a web page, the server may identify the client device type and/or platform from the request headers, and may retrieve and transmit a specific set of markup language files, style sheets, etc. Additionally, some web content providers may support limited user-customization of the web page, such as by providing a "dark mode" feature within the web page that allows the user to toggle the rendered web page between lighter and darker styles, or by allowing the client user to change the font size displayed within a web page. However, support for customization features is limited and must be implemented by the backend web server.

BRIEF SUMMARY OF THE INVENTION

Accordingly, the embodiments described herein relate to techniques for generating and injecting updated style sheets and/or other web content via the web browser executing on the client device, thereby updating the style, layout, and format of the web content rendered on the client device, with little or no change to support required from the backend web server. For example, certain embodiments described herein include a client device requesting, receiving, and analyzing web content from a web server. The client device may analyze the web content to identify individual elements within the web pages, including element identifiers, values, and/or other properties. The client device may transmit subsequent requests to the web server to retrieve element definitions, which may be specific element identifiers and/or groups of elements. Using the element definitions, the client device may dynamically generate updated web files (e.g., markup language files, style sheets, etc.), and then inject the updated web files (e.g., using JavaScript) into the remaining web content received from the web server, to be displayed on the client device. These techniques allow for specific formatting, layouts, and styles to be applied to web elements, such as tables, images, controls, and any other web elements, using the updated style sheets and other web content generated dynamically by the client device.

Additionally, in accordance with certain embodiments, the web browser executing on the client device may determine the form factor, user input controls, and/or various other client device capabilities and characteristics, and may use the determined device characteristics to generate the updated presentation markup, style sheets, etc., for the web content. Such customization also may be performed based on characteristics of the current user operating the client devices, for example, by altering element sizes, color schemes, user input controls, etc., based on the preferences or characteristics of the current user which may be determined by the client web browser. Further, in some embodiments, changes to the form factor and/or characteristics of the client device may be detected after requesting and rendering the initial web content. For example, a smartphone or table client may connect (e.g., via screen mirroring or pairing) with a television or other external display, allowing the display of the client smartphone or table to be projected to the external display. In such cases, the client device may re-generate the markup and/or style sheets based on the detection of the new external display (and/or any changes detected to the client device) allowing the web content to be dynamically regenerated and rendered to the external display.

As discussed in detail below, the techniques described herein provide advantages over conventional techniques of providing and tailoring web content to a variety of client devices. For example, by analyzing and parsing the web content, retrieving specific web element definitions, and then generating style sheets and other web resources using dynamic code generation and injection by browser executing on the client device, significant backend processing resources and network resources may be saved. Additionally, by supporting robust client-specific customization of web content style, layout, formatting, and the like, fewer code changes (or even none) may be required on the server side, thereby avoiding the additional software development, testing, and deployment processes. Similarly, the requirement to generate and updated multiple copies and versions of cascading style sheets (CS S) for various client devices may be avoided by the web server, instead providing the client devices with the web content and element definitions necessary to generate and inject dynamic CSS directly at the client web browser. Finally, the embodiments described herein support many more types of layout, style, and format changes/customizations than could be supported using conventional techniques. The client device may have more information about its own specific platform, characteristics, capabilities, form factor than does the web server, and thus the client may determine optimal layouts, styles, and formats for individual web elements and entire web pages, based on these specific characteristics.

Figure 1:
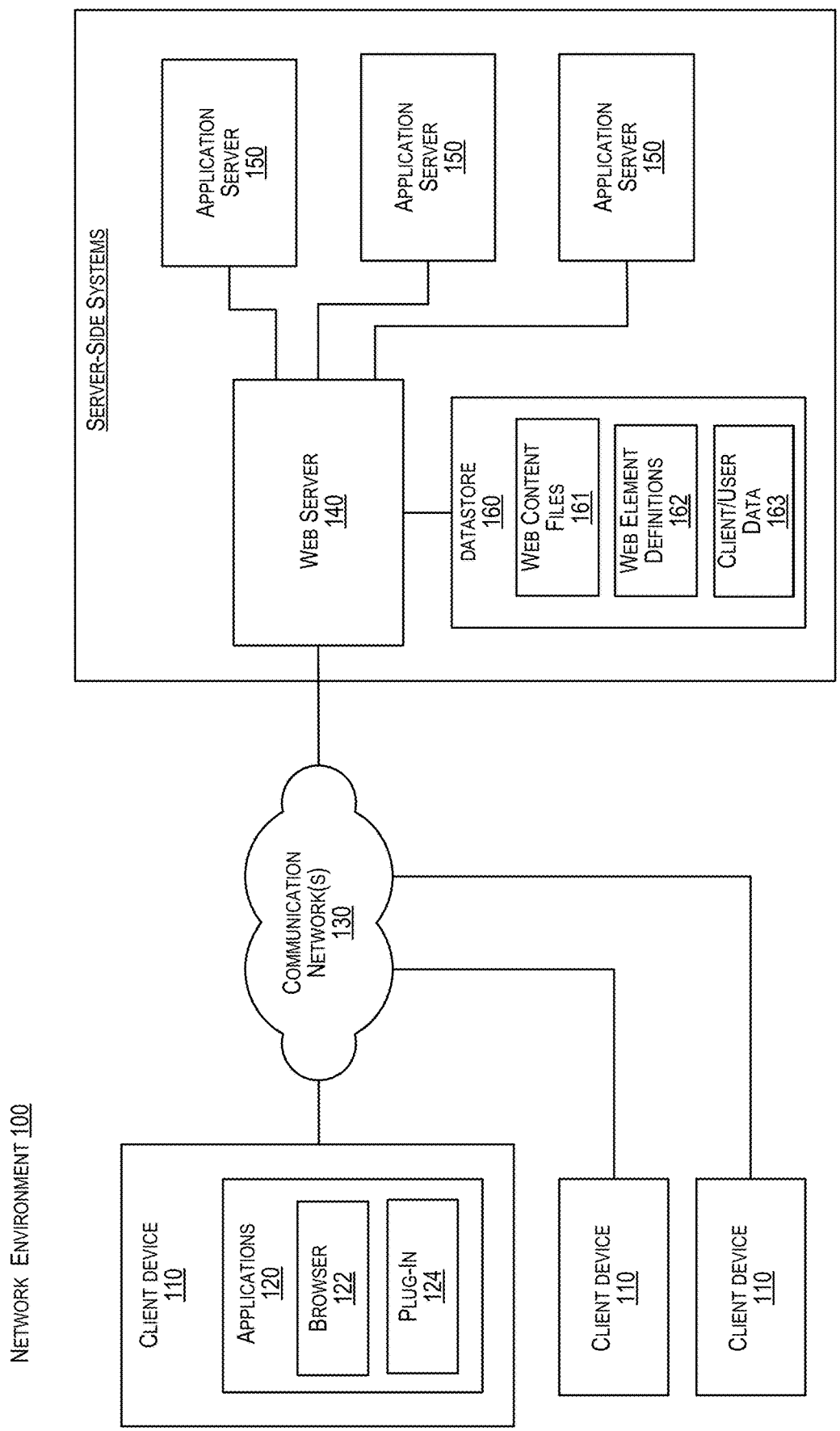
FIG. 1 illustrates a client-server network environment including various server-side systems configured to provide web content to client devices, in accordance with one or more embodiments of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION OF THE INVENTION

In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

As noted above, various aspects described herein relate to techniques (e.g., methods, systems, devices, computer-readable media storing computer-executable instructions used to perform computing functions, etc.) for generating and injecting updated web content (e.g., style sheets, XML or HTML pages, etc.), using the web browser executing on the client device. Such techniques thus may support client device-specific customization of the style, layout, and format, etc., of web pages, without requiring additional support or workload on the backend servers and networks. In certain embodiments, a client device may request, receive, and analyze web content from a web server. Such web content may range from simple web pages to complex client facing interactive web-based portals and applications. The client device may analyze the web content to identify various web elements within the web pages, including element identifiers, values, and/or other properties. Using the web element identifiers, the client device may request and obtain element definitions from the web server and/or other third-party server. After receiving the web element definitions, the client device may dynamically generate updated web content files, including style sheets, markup language files, JavaScript files, etc., to implement a particular style or format for individual web elements and/or a particular layout for the web page. The updated web content files may be injected into the original web content received from the web server, for example, using a JavaScript code injector, and then rendered via the client web browser to the client display. Thus, such techniques may allow automated client-specific customization and/or user-requested customization for specific formatting, layouts, and styles to be applied to web elements such as tables, images, controls, and any other web elements, without requiring additional requests and processing from the web server and other backend systems.

Additionally, in some embodiments, the web browser executing on the client device may determine the form factor, user input controls, and/or various other client device capabilities and characteristics, and may use the determined device characteristics to generate the updated presentation markup, style sheets, etc., for the web content. Such customization also may be performed based on characteristics of the current user operating the client devices, for example, by altering element sizes, color schemes, user input controls, etc., based on the preferences or characteristics of the current user, and the like, which may be determined by the client web browser. Further, in some embodiments, changes to the form factor and/or characteristics of the client device may be detected after requesting and rendering the initial web content. For example, a smartphone or table client may connect (e.g., via screen mirroring or pairing) with a television or other external display, allowing the display of the client smartphone or table to be projected to the external display. In such cases, the client device may re-generate the markup and/or style sheets based on the detection of the new external display (and/or any changes detected to the client device) allowing the web content to be dynamically regenerated and rendered to the external display, again without requiring additional requests and processing from the web server and other backend systems.

Referring now to FIG. 1, a network environment 100 is shown, including various server-side systems 140-160 configured to transmit web-based content to client devices 110 over one or more communication networks 130. As described in the examples below, webpages and other web content may be generated by a web server 140 and/or backend application servers 150, and provided by the web server 140 to various client devices 110. Web content may include markup language code files (e.g., HTML, XML, etc.), each of which may correspond to a different web address/URL and may define one or more webpages of a web site or domain. Additional web content associated with and/or referenced by the markup language code files may include style sheets (e.g., Cascading Style Sheets (CSS)), image files, video files, and programmatic code files (e.g., script files, executables). As shown in this example, web content files 161 (which may also be referred to as web resources) may be stored in or more backend data stores 160, while other web content may be stored and/or generated by backend application servers 150.

Various web elements may be represented within web content files 161, or generated by backend servers 150, including web elements embedded within markup language files and/or web elements representing data objects stored in separate web resource files 161. Such web elements may correspond to, for example, web page controls/components such as frames, command buttons, headings, text blocks, titles, menu options, tables, paragraphs and/or sentences. Additional web elements may include image files, video files, audio files, graphics files, etc., as well as more complex programmatic elements such as pagelets. applets, and other embedded executables. As shown in this example, additional data may be stored within the server-side data stores 160 as well, such as web element definition data 162 and client/user data 163.

Web element definitions, described in more detail below, may refer to a set of properties or characteristics associated with any of the web content elements 161. Thus, a web element definition 162 may define a size or range of size that of the web element should be rendered within a web page, and/or the style that should be used when rendering the web element on a web page. Certain types of web element definition data may apply to all possible web elements, while other web element definition data may be specific to the type of the web element. For instance, a grid/table web element, the web element definition 162 may include data indicating if a table header, title, and navigation bar(s) are to be displayed, and where on the table object they should be rendered, whether the grid/table element includes embedded popup help, the background style, properties of the row action buttons, column headings style, display footer properties, etc. Additionally, web element definitions 162 may include, for any web object/element, whether or not the web element may permissibly be suppressed (and/or whether it should be suppressed) when the web element is displayed on screens of various form factors (e.g., small, medium, large, or extra-large form factors, etc.). In some embodiments, each web element definition in data store 162 may be stored with one or more associated element identifiers. An element identifier within the data store 162 may be unique to an individual web element (e.g., a particular frame, particular table, particular text box, etc.), and/or to particular types of web elements (e.g., all frames, all tables, all text boxes, etc.). Additionally, element identifiers may be used to define groups of web elements to which a common set of properties should be applied when rendered.

Client devices 110 may send web requests and receive web content from the application servers 150 and/or web server 140, via a network 130. Network 130 may include, for example, the Internet, a local area network, and/or wide area network, etc. Although only a single network 130 is shown in this examples, the network 130 may include any number of different communication networks between any of the computer servers and devices described herein. Various implementations of communication networks 130 may employ one or a combination of different types of networks, such as IP-based computer networks, telecommunications networks, cellular networks, short-range and long-range wireless networks, cable or satellite networks, and/or any combination of these and/or other networks. Client devices 110 may include mobile devices such as smartphones, tablet computers, virtual assistant devices, vehicle-based devices, and wearable computing devices (e.g., smartwatches, smart glasses, etc.). Such mobile devices may run a variety of mobile operating systems, and may be enabled for Internet, e-mail, short message service (SMS), Bluetooth®, mobile radio-frequency identification (M-RFID), and/or other communication protocols. Other client devices 110 may be general purpose personal computers or special-purpose computing devices including, by way of example, personal computers, laptop computers, workstation computers, projection devices, and interactive room display systems. Additionally, client devices 110 may be any other electronic devices, such as a thin-client computers, an Internet-enabled gaming systems, business or home appliances, and/or a personal messaging devices, capable of communicating over network(s) 130.

As shown in this example, client devices 110 may include a number of software applications 120, including one or more web browsers 122 and browser plug-ins 124 (which may also be referred to as browser extensions). As discussed below in more detail, code within the client web browser 122 and/or plug-ins 124 may be configured to analyze various elements of web content received from web servers, retrieve corresponding web element definitions, and then dynamically generate updated Cascading Style Sheets (CSS), markup language documents, and/or other web content at the client side 110, without minimal (or no) intervention required by the server systems 140-160. Additionally, browser extensions and/or plug-ins 124 may include the functionality and support the user interfaces to allow administrator users to manually request and implement updates to the style, format, and/or layout of web content rendered at the client devices 110. The code within the browser 122 and/or plug-ins 124 also may be configured to automatically detect various characteristics and capabilities of the client device 110, and to detect and respond to connections between the client device 110 and associated client devices or displays 110, as discussed below. Additionally, although several examples are described in reference to browser extensions or plug-ins 124, it should be understood that the techniques discussed herein are not limited to extensions or plug-ins. For example, any browser extension or plug-ins functionality described herein may additionally or alternatively be implemented as within the browser 122, or a piece of code which is embedded on the server-side into the native web page transmitted to the client 110. Thus, in any of these examples (e.g., code within the browser 122, plug-in/extension 124, embedded within the web page, or residing elsewhere on the client device 110), the code may continue to execute after the browser 122 has finished loading the web page at the client device 110.

Figure 2:
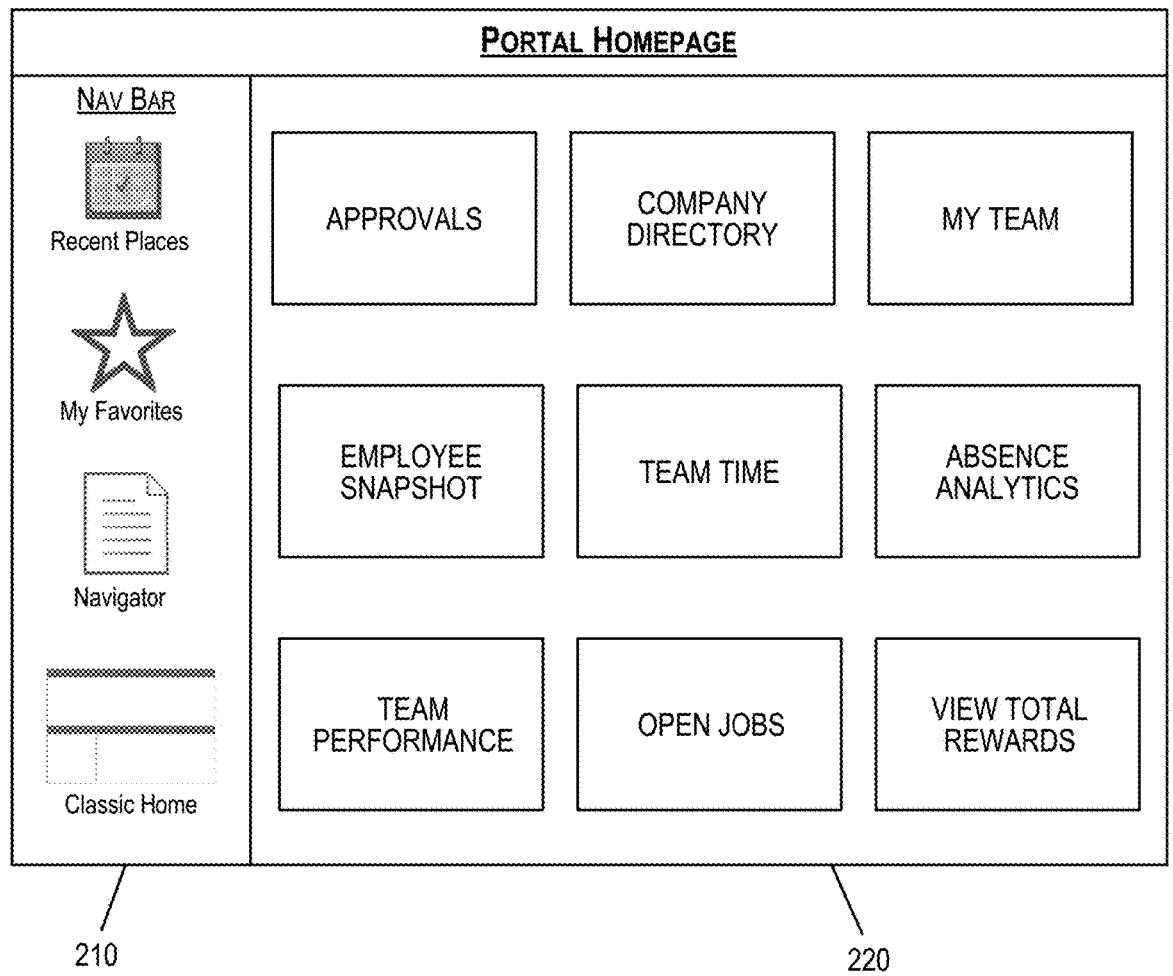
FIG. 2 is an example user interface of a customized web portal including a number of pagelet web elements, in accordance with one or more embodiments of the present invention.

Referring now to FIG. 2, an example user interface 200 is shown. In this example, user interface 200 may be generated by a customized web portal application, which may tailor the particular web elements and content to the current user of the web portal application. Thus, unlike a simple HTML page or other static web content, the user interface 200 may be dynamically generated based on the current user, the user's privileges and authorizations to access certain applications via the portal, and the user's preferences for components to be displayed, screen layout, etc. Thus, in this example, a number of pagelet web components 220 may be generated and displayed dynamically for the specific user, where each pagelet component 220 corresponds to a particular portal application or component currently accessible to the user. Menu 210 may include a universal set of components that are displayed identically for each user, although different functionality may be performed when different user select the same menu buttons. Thus, even when the menu 210 rendered in the user interface has a similar or identical appearance, the underlying markup language code may be different and/or different scripts/software functionality may be invoked by particular menu buttons.

In some embodiments, the web-based content provided by web server 140 and rendered by a client device 110 may correspond to fluid homepage, or portal homepage, for an interaction hub of an end-user software product line, such as PEOPLESOFT® from Oracle, and the like. In such cases, web page 200 may be a homepage page that aggregates related information and displays tiles 220 that provide access to fluid applications. The tiles 220 in this example, may be compared to pagelets in a classic portal, and they are the navigational constructs displayed on the fluid homepage 200. Like other pagelets, the tiles 200 may be reusable user interface widgets. These tiles/widgets 220 may either be designed for display only in portals 200, or may be designed to run on any web page.

Web page 200, which may be a fluid homepage in some cases, and the components/tiles 220 displayed therein, may share a common purpose or apply to a specific user or role within the software application, such as an employee role, manager role, clerk role, etc. The user may interact with the tiles 220 on their homepage 200, and may select a particular tile to access the underlying application and perform routine tasks. Tiles 220 typically may have a graphic on them, portraying the purpose of the underlying application, which may help the user to identify and associate the tile with the application. Some tiles 220 also may display current information, providing dashboard functionality for the user to review high-level information for decision making or monitoring.

In some cases, when the web page 200 is first accessed by the user, the client web browser 122 may access to the web server 140 and/or application servers 150, to reload and refresh all of the content (e.g., tiles/components 220). The browser 122 then may re-render the homepage 200 manually, so that all live tiles 220 (and/or other web elements) display the most current representation of the underlying data. Further, in some examples, individual tiles 220 and/or other web elements may be configured to refresh at specific rates. Users also may be permitted to personalize their homepage experience via the web page 200, for example, by creating or deleting personal homepages, adding and removing tiles 220 and/or other web elements from their homepages, and changing the titles/properties of their homepages.

Additionally, certain web pages, including pages 200 such as those displayed by a PEOPLESOFT® fluid user interface or the like, may be designed to display differently depending upon the client device 110 accessing the user interface. For example, the same page 200 may be accessed via a desktop, laptop, tablet or a smartphone, and the layout of the page 200 may be different for each type of device. For instance, on a the tablet device, more fields may appear, with more space between them, while on a smartphone device, less fields may appear and the display may adjust to the smaller space available on the smartphone.

Figure 3:
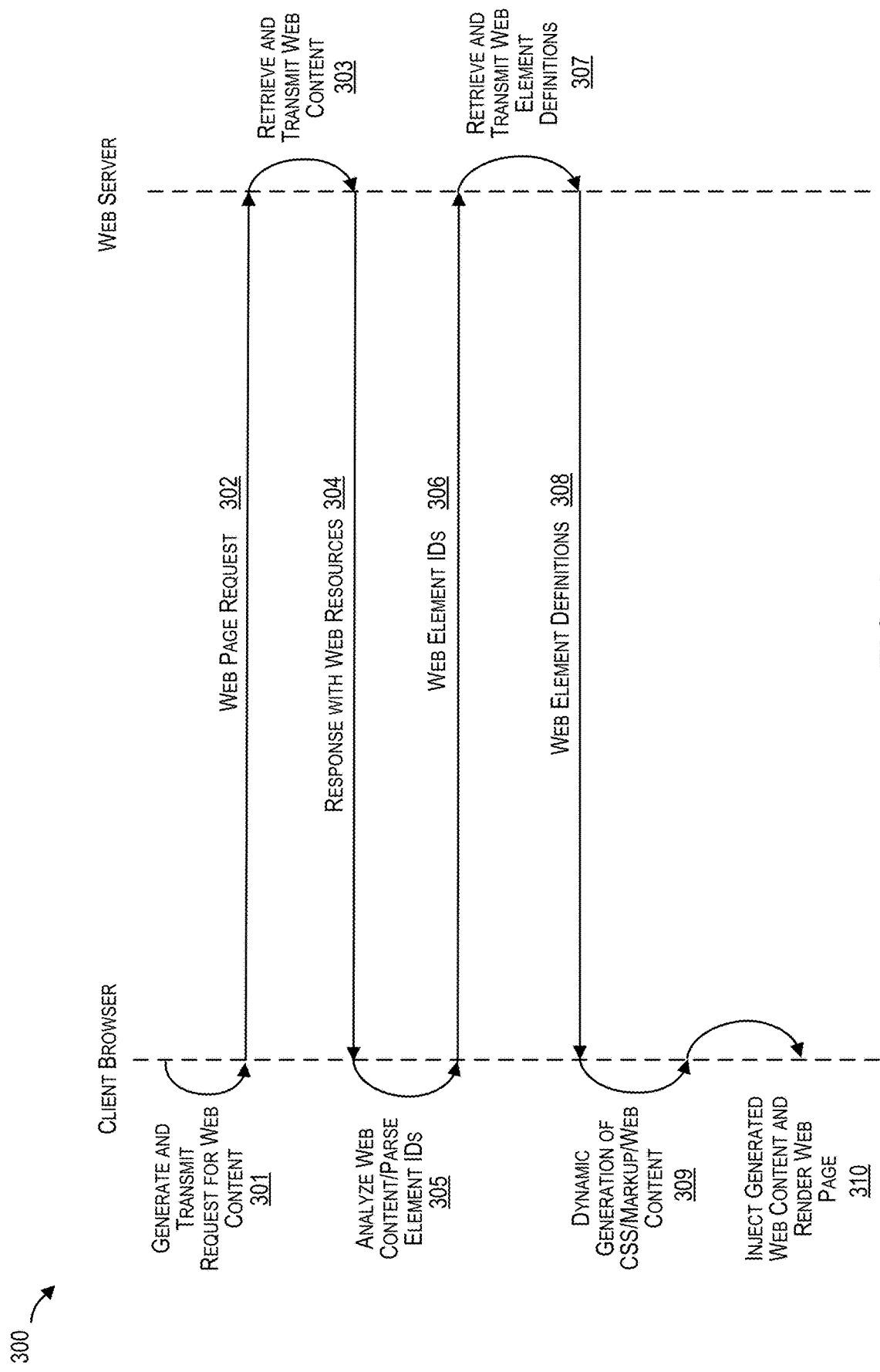
FIG. 3 is a client-server flow diagram illustrating an example process of generating and rendering customized web content at a client device, in accordance with one or more embodiments of the present invention.

Referring now to FIG. 3, an example of a flow diagram is shown, illustrating a processes by which a client device and web server collaborate to generate and render customized web content at the client device. As discussed in the examples below, the steps in these processes may be performed by a client device 110, and a web server 140 in collaboration with one or more additional server-side systems (e.g., 150-160). In other examples, certain web content/ web resources may be requested/retrieved from the web server 140, while others are retrieved directly from an application server 150, data store 160, or a separately-operated third-party server. For instance, the substantive web content (e.g., web elements/resources themselves) may be requested and retrieved from one computer system 140-160, while style data (e.g., CSS), formatting and/or layout data may be received from a separate system 140-160 or third-party system. Multiple client devices also may collaborate similarly, for example, where a first client device 110a may request/receive the web content, and then a second client device 110b may render and display the content. Additionally, multiple different client devices 110 may share web elements in some cases, and/or may share web element style data, layout data, and/or formatting data. For instance, a client device 110 may retrieve a set of web resources from a web server 140, but may retrieve style data, etc., from a separate client device 110 or other local system. Further, it should be understood that the processes described in these examples need not be limited to computing systems, networks, and architectures shown in FIGS. 1-2 and 5, but may be implemented within other compatible computing systems and networks as well.

In step 301, a web client device 110 may generate and transmit a request for web content to a web server 140. In some cases, a request in step 301 may be request for the particular web page/web resources corresponding to a universal resource locator (URL), similar or identical to those used in conventional web page requests. The request in step 301 also may be refresh request, initiated by the user or automatically by a client-side browser 122 or other web application. The request in step 301 also may be a request within an ongoing web session and/or user- or session-specific interaction with a web portal or web-based application. Thus, the request in step 301 need not specify a new or unique URL, but instead may correspond to an invocation of SOAP or REST web services, JSON requests, etc., which may convey parameters or other client-side interaction data to the web server 140, as part of an active session.

The transmission of the request 302 from the client device 110 to web server 140 may be performed via TCP/IP, any known web-based protocols (e.g., HTTP/SOAP) and/or encryption. In some embodiments, the request 302 may include data identifying the current session, user, client device, client devices characteristics, and/or platform. For example, certain header data within the request 302, or parameters embedded within the request URL and/or the body of the request 302, may include a session identifier, user identifier, client platform identifier, data identifying the client form factor, etc.

In step 303, the server-side systems, including web server 140, may receive and process the request, including retrieving and/or generating web-based content responsive to the request 302. As noted above, the responsive web-based content may include any number of static web resources such as web page documents (e.g., HTML and XML files) along with related scripts (e.g., JavaScript files), style sheets (e.g., CSS files), embedded executable applications (e.g., applets), images, and other web-based resources, which may be retrieved from one or more data stores 160. Additionally or alternatively, the request 302 may be a web services request, and the responsive web-based content in step 303 may include the responses dynamically generated by one or more backend web services executing within application servers 150, which may be supplemented by additional web elements/resources retrieved from data stores 160. Thus, the response 304 transmitted back to the client device 110 may include active (e.g., programmatic) and/or passive web elements, and may be transmitted via a single message, series of messages, streaming session, etc. For instance, a response 304 may include one or more primary web page documents, along with a number of associated resources (e.g., scripts, style sheets, images, executable applications, etc.) that may be used when rendering the primary web pages and/or may be embedded within the primary web pages.

In step 305, the client device 110 may analyze the web content received from the web server 140, parse the content to identify one or more individual web elements, and then determine a set of element identifiers (IDs) for the individual web elements. In some embodiments, some or all of step 305 may be performed by native functions of the browser 122 and/or by a browser plug-in or extension 124. In some cases, the analyses and parsing in step 305 may be performed in response to an explicit client user request, while in other cases step 305 may be performed automatically and may be transparent with respect to the user of the client device 110. For example, certain implementations may be performed automatically to customize a received web page based on the client device data, user data and preferences, etc. In such implementations, step 305 may be performed automatically by the browser 122 and/or plug-in 124, and the web content 304 might not be rendered at all by the browser 122 on the client device 110. However, in other implementations described below, the web content 304 received from the web server 140 may be initially rendered and displayed on the client device 110, after which the user may request a change to the style, format, and/or layout of the content. In these implementations, step 305 may or may not be performed initially upon the receipt of the web content 304, and alternatively may be performed in response to the user request for the style/format/layout change.

During the analysis of the received web content in step 305, the web content may be parsed to identify a number of web elements, and to retrieve identifiers embedded within the web content for each of the identified web elements. As described above, a web element may include any data object within the received web content 304 having a distinct properties and/or identifier from other data objects within the web content 304. Thus, some web elements may be defined by tags within the markup language document (e.g., HTML or XML) for a web page, while other web elements may correspond to objects within separate associated markup language documents, or embedded images, scripts, executables, etc. Thus, analyzing the web content in step 305 may include parsing markup language documents and/or other associated web content files (e.g., script files, image files, executables, etc.) to identify and analyze the particular data objects stored therein. For each, web element encountered, the browser plug-in 122 (or other software code executing step 305) may retrieve one or more web element identifiers (or web elements IDs) from the web content corresponding to the web element. A web element may be one of or a combination of the object's name, the object's ID number, the object's type, the object's associated URL or address, etc. For objects embedded within markup language, the web element ID may be determined by parsing the markup language and analyzing its various tags, attributes, and sub-elements, and then determining the unique element-identifying data within the data object. For other types of web elements, the web element ID data may be determined by parsing the separate associated data objects/files, including script files, image files, executable files, etc., to determine the unique object identifiers/properties associated with the particular web element. In some cases, a web element ID may be entirely unique to that web element, while in other cases the web element ID may identify only the type of the web element. For example, the browser plug-in 124 may identify a table object within the web content 304, and may assign the table object with a web element ID corresponding to its object type, such as "table" or "grid." However, in another example, the browser plug-in 124 may identify a specific table based on its name/title property, heading, grid size, and/or contents, and may assign a more specific web element ID to the table object, such as "Table 5692" or "Products Inventory Table Q1" or a corresponding alphanumeric code identifier that is unique to the specific table. Similar web element IDs may be determined for frames and framesets within the web content, web page menus and headers, images, videos, text blocks, web controls, embedded widgets and other active objects, etc.

In step 306, the client device 110 transmits the set of web element identifiers determined in step 305, back to the web server 140. In some cases, the transmission from the client device 110 to the web server 140 may include an alphanumeric listing of the web element identifiers found within the web content. Additionally, in some embodiments, the transmission in step 306 may require multiple requests-responses between the client device 110 and the server 140. For example, if there are duplicate web element IDs, then multiple server trips may be necessary (e.g., to transmit/compare additional characteristics of the web element) to identify the correct web element identifier that corresponds to the web element parsed out of the web content by the browser 122 and/or plug-in 124.

Additionally, in some embodiments, when parsing the web content, the browser 122 and/or plug-in 124 may determine and extract values associated with the different web elements. For example, user interactive web elements (e.g., web controls) such as checkboxes, radio buttons, text boxes, etc., may have associated values, such as checked/not-checked, selected/not-selected, input text/numbers within the text box, etc. Similarly, for web elements such as list boxes, grids, and tables, the browser 122 and/or plug-in 124 may capture the table/list/grid identifier and/or identifiers for each individual row, as well as the data within each of the rows/cell. It might not be necessary to transmit the data values for the various web elements to the web server 140 in step 306, and instead these values may be stored locally on the client device.

As discussed below, potential advantages of the techniques discussed herein may include reducing or even eliminating a number of client-server requests and responses for updated web content. Because data from the web elements may be extracted and stored on the client device 110 (e.g., within the browser memory), it is not necessary for the client 110 to retrieve the web element data a second time from the server 140 when performing a client-side update to the formatting, style, or layout of the web content. Similarly, as discussed below in more detail, the client device 110 need not re-retrieve the HTML of the web content, the CSS files, and the other web content files (e.g., scripts, executables, images, etc.), when performing a client-side update to the formatting, style, or layout of the web content. Rather, by parsing/transmitting the web element IDs (steps 305-306), and then retrieving the corresponding web element definitions (steps 307-308) the client web browser 122 and/or plug-in 124 may use a client injection script to regenerate the web content (e.g., CSS) at the client side, and then re-layout and re-render the web page.

As noted above, in step 307 the web server may receive the client request 306 including the web element IDs, may retrieve the corresponding web element definitions from data store 162 and/or other data sources, and then transmit back the web element IDs and corresponding definitions to the client device 110 in step 308. The definition data for a particular web element may include data values/ranges that define one or more features of design metadata for the particular web element. Examples may include a number (or range) of pixels for the elements, layout information, properties for the element, style data, etc. This design metadata may be stored in the server-side systems, in order to allow the content provider and/or web server 140 to control (if desired) how certain aspects the particular web elements are displayed on the client devices 110. As noted above, the web element definition data 162 stored on the server-side and transmitted to the client device 110 in step 308 may include style data, although this style data need not include style sheets (e.g., CSS files), but rather may include more compact style property data (e.g., fonts, colors, style sets, spacing requirements, etc.). In fact, as noted above, there may be significant advantages to server processing load, network load, etc., in not transmitting the full CSS files, and instead generating the updated CSS files at the client device 110.

Accordingly, in step 309, the client device 110 may use definition data received in step 308 for the web elements, along with the web content previously received in step 304, to generate updated web content that will be displayed on the client device 110. The generation of updated web content in step 309 may include dynamically generating new cascading style sheets (CSS files) to change the style of individual web elements and/or the entire web page displayed via the browser 122. Additionally or alternatively, the browser 122 or plug-in 124 may re-generate some or all of the markup language files, scripts, and/or may make other modifications to any of the web content originally received in step 304.

In some embodiments, the dynamic generation and/or modification of web content in step 309 may be based on device specifications, user preferences, and/or based on express user requests received via the browser user interview. For example, the CSS and/or other web content generated in step 309 may be based on the particular hardware, software, and/or platform of the client device 110. In some cases, the browser plug-in 124 may determine client device characteristics, such as the display form factor of the client device 110 (e.g., the size, shape, and quality/characteristics of the client display, etc.), and/or the input device features of the client device 110 (e.g., touchscreen or not, pen-input or not, voice control or not, gesture recognition or not, etc.), and then use the combination of the client device characteristics and the web element definition data received in step 308, to determine the style/layout/format for the web elements. For example, for a particular web element (e.g., text box, button, image, etc.), the code of the browser 122/plug-in 124 may use the pixels and style data for the element received in step 308, and the display form factor data of the client device 110, to determine the particular CSS style for the web element. In other examples, the style, format, and/or layout of any of the elements of the web content (and/or combinations of elements), may be determined in step 309 based on the web element definitions along with the locally-determined client device 110 characteristics (e.g., display characteristics, input types, mobile device platform, etc.).

Finally, in step 310, the client device 110 (e.g., using the browser 122 and/or plug-in 124) may update the web content received in step 304 based on any dynamically generated and/or modified CSS or other web content files in step 309, and then may render the updated/modified web content out to the display(s) of the client device 110. In some embodiments, the client device 110 may execute a code injection script to generate the CSS (or other web content) at the client side, and then inject (or integrate) the modified CSS (or other files) into the web content received in step 304. As noted above, certain client devices 110 may be associated with one display device, while other client devices 110 may be associated with multiple displays. The client displays may be integrated (e.g., for tablet devices, smartphones, wearables, etc.), or separate detached displays (e.g., for desktop computers, screen mirroring/pairing technologies, etc.).

In some embodiments, the web content received in step 304 may be initially rendered and displayed at the client device 110, and then may be re-rendered and re-displayed in step 310. For example, the web browser 122 executing on the client device 110 and/or the user interface itself may support on-the-fly style configuration features that allow the user to dynamically change the style, layout, and/or formatting of the web page currently being displayed. For example, a browser feature or embedded web control within the user interface may be selectable by the user, and may allow the user to change the color scheme of the current web page (e.g., dark mode, light mode, or select different color patterns), change the sizes of web elements on the page, change the text sizes or fonts, change the text or element spacing, etc. These types of on-the-fly style configuration features may be accessed via the browser menu or via a control on the web page itself, and the style configuration changes may apply to individual web elements, whole web pages, and/or to the user's entire browsing session or future sessions. In these examples, the web browser 122 may perform a first rendering of the web page in steps 304-305 which may be visible to users via the display screen, followed by a re-rendering of the web page in steps 309-310 which may visibly change the appearance of the web page on-the-fly. Such changes may be initiated by an express user request, which may be received before step 305 in some implementations or before step 309 in other implementations. Further, as noted above, the re-rendering and appearance changes of the web page need not require re-loading the web page and/or any additional requests/responses to the web server 140 or other server-side systems.

In other embodiments, the steps in this example may be performed without two separate renderings/displays of the web content. For example, rather than a first rendering of the web content followed by a second rendering (e.g., initiated by a user request) that changes the current display, the steps in this example may be performed automatically, so that the web content received in step 304 is rendering and displayed only once in step 310. For example, the request/receipt of web element definitions in step 306-308 may be performed automatically by the web browser 122 or plug-in 124. Additionally, the dynamic generation of CSS or other web content, and the injection and integration of the new content into the web content received in step 304 may be performed automatically based on the characteristics of the client device 110, platform, or browser, and/or based on previously defined user preferences or device preferences, etc. Thus, these intermediate steps may be transparent to the user, and the first visible output from the web request in step 302 is the modified web content generated in step 310, including the injected code to modify the style, format, and/or layout. Also, as in the examples above, these examples also need not require re-loading the web page and/or any additional requests/responses to the web server 140 or other server-side systems.

Figure 4:
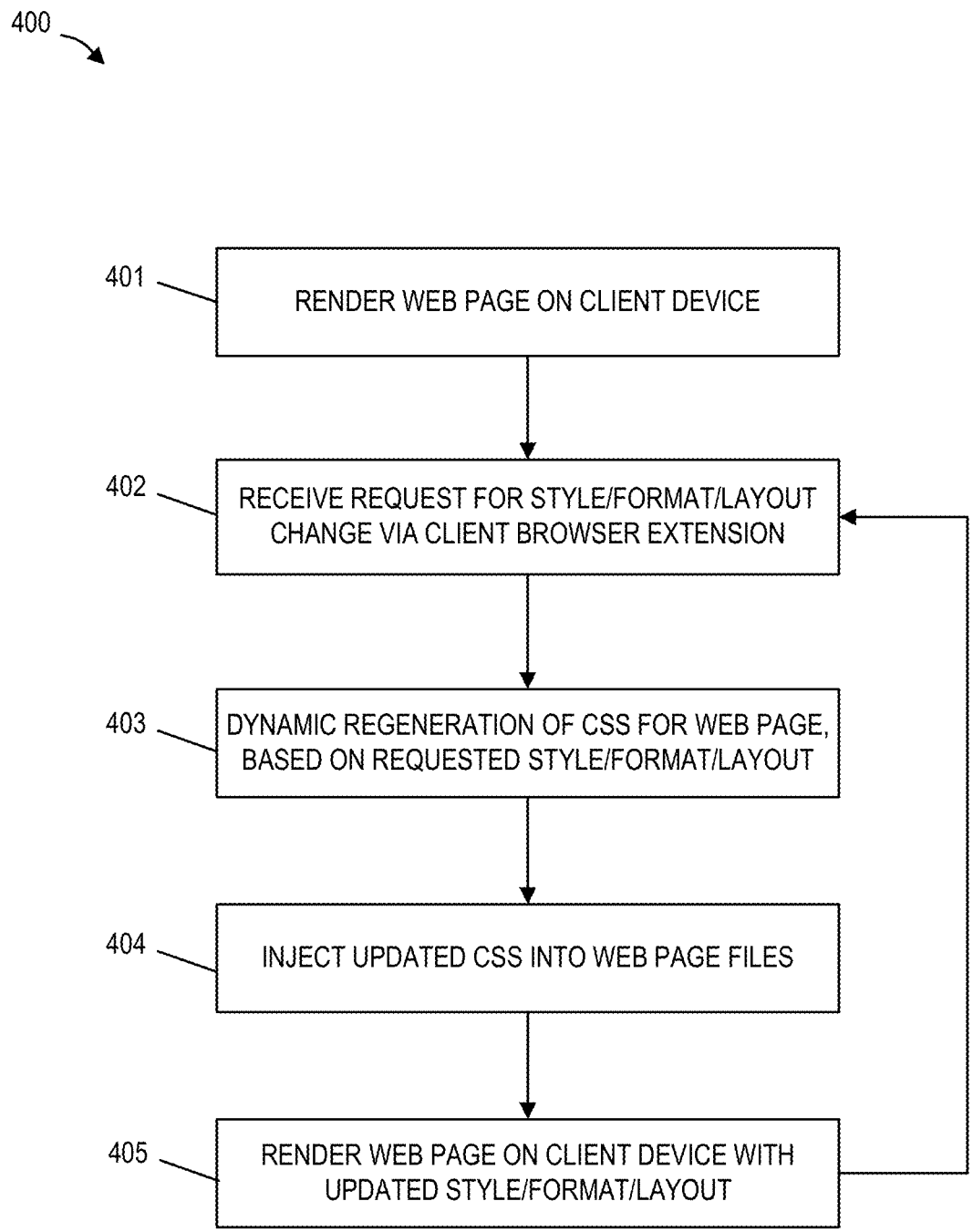
FIG. 4 is another flow diagram illustrating an example process of generating and rendering web content at a client device, having an updated style, format, and/or layout, based on a client request, in accordance with one or more embodiments of the present invention.

Referring now to FIG. 4, a flow diagram is shown illustrating a process of generating and rendering modified web content at a client device. Thus, steps 401-405 in this example may correspond to the functionality performed at a client device 110, during certain embodiments of the collaborative process discussed above in FIG. 3. In particular, this example describes in more detail the steps performed via the client web browser 122 and/or browser extension 124, when allowing a user to change the style/format/layout of web elements, web pages, and/or browsing sessions, on-the-fly and without requiring additional content requests back to the web server 140.

In step 401, the browser 122 receives and renders web content (e.g., a web page) on the applicable display(s) of the client device 110. The web content received and rendered in step 401 may include static web resources such as web page documents (e.g., HTML and XML files) along with related scripts (e.g., JavaScript files), style sheets (e.g., CSS files), embedded executable applications (e.g., applets), images, and other web-based resources. These resources may be received from the web server 140 and/or other server-side systems, and may be stored in the browser memory 122, where they may be analyzed, parsed, and then rendered into displayable web content that may be output to the client display.

In step 402, a request may be received from a user, during a web browsing session, to change one or more aspects of the style, format, or layout of the currently displayed web page. In some embodiments, a browser extension (e.g., plug-in 124) may provide additional browser menus or menu options that may be selected by the user to select the change. Such menus may be integrated within the existing browser menus, or may be added via a side menu, right-click menu options, etc. In some cases, the user controls to change the style/format/layout of the current web page may be embedded within the rendered display of the web page itself.

As discussed above, a variety of different options may be provided to allow the user to change the style, layout, or format of the web page. In some cases, a browser menu option may allow the user to change the color scheme of the current web page (e.g., dark mode, light mode, or select different color patterns), change the background pattern of the web page, change the sizes of web elements on the page, change the text sizes or fonts, change the character spacing or spacing between elements, change the text style, change the size or display characteristics of images on the page, change the layout of the web elements on the page, etc. It should be understood that there need not be a fixed or enumerated set of style/format/layout change options provided by the browser 122 or browser extension 124. Rather, additional potential advantages of these embodiments include that an unlimited number of possible style/format/layout changes and configurations may be supported on the client-side using dynamically generated CSS (and/or other web content), and therefore no additional support or effort is required within the server-side systems to preprogram the CSS or otherwise support the various different possible style/format/layout options.

Thus, in some embodiments, the browser 122 or plug-in 124 may allow the user to make one or more on-the-fly changes to the currently displayed web page, by generating CSS (and/or other web content) dynamically on the client-side, and without requesting additional web content from the server-side. In some examples, the menus, change options, and user interfaces provided by the browser plug-in 124 may allow the user to change not only the current web page, but also may be applied to the remainder of the user's web browsing session and/or to the user's future web browsing sessions on the client device 110. Additionally, in some embodiments, the menus, change options, and user interfaces provided by the browser plug-in 124 may allow the user to change individual web elements rather than the web page as a whole. For example, changing the background on one frame but not others in the page, changing the style on certain web controls but not others in the page, etc.

In step 403, the browser 122 and/or extension 124 executing on the client device 110 may dynamically regenerate the CSS to replace the original CSS received in step 401. In some cases, the browser extension 124 may regenerate and inject only certain blocks of CSS content into the received CSS files, while in other cases, the browser extension 124 may regenerate and replace entire CSS files. Additionally, although this example only relates to CSS files, as discussed above the browser 122 and/or extension 124 may be configured to regenerate and replace different types of web content as well, including markup language files, script files, image files, executables, etc.

The regeneration of CSS (or other web content) may be performed based on the user change request and the user selection of a new style/format/layout configuration for the web elements and/or web page received in step 402. For example, if the user requests a different background, color scheme, font style, etc., then the browser extension 124 may either replace or modify the original CSS received in step 401 to effect the desired change. Additionally, in some cases, the web element definitions of the web elements displayed on the current web page may be used in the dynamic regeneration of the CSS (or other web content). As discussed above, definitions for particular web elements and/or groups of web elements may be stored within the server-side systems (e.g., data store 162). Web definitions may correspond to design metadata stored and managed by the server-side systems, to content provider and/or web server 140 to control or limit how certain aspects the web elements are displayed on the client devices 110. Although the retrieval and use of the web element definitions may be optional in some embodiments, when the web element definitions from the server-side are used, the client may retrieve them either during step 403 or at any time before step 402. When used, the web element definitions may provide guidance and/or limiting parameters to the client, regarding the size (e.g., pixel ranges), permissible style parameters, etc., for individual web elements and/or groups of web elements.

Additionally or alternative, the regeneration of CSS (or other web content) in step 403 may be performed based on certain characteristics of the client device 110. For example, as discussed above, the dynamically generated CSS (and/or other web content) may be based on the particular hardware, software, and/or platform of the client device 110. For instance, during or before step 403, the browser extension 124 may determine client device characteristics, such as the display form factor of the client device 110 (e.g., the size, shape, and quality/characteristics of the client display, etc.), and/or the input device features of the client device 110 (e.g., touchscreen or not, pen-input or not, voice control or not, gesture recognition or not, etc.). The browser 122 and/or extension 124 then may use the combination of (a) the client device characteristics, (b) the web element definition data retrieved from the server-side, and/or (c) the user request to change the style/format/layout of the web content received in step 402, to determine the updated style changes and then generate the corresponding CSS (and/or other web content.

In step 404, the client device 110 may inject the updated CSS (and/or other web content), dynamically generated in step 403, into the web content received in step 401. Then, in step 405, the client device 110 may render the updated web page content onto the client display, which will include the updated style/format/layout for the web page. Thus, steps 404-405 may be similar or identical to step 310, discussed above. In some embodiments, the browser extension 124 may include a code injection script that generates the CSS (or other web content) at the client device 110, and then injects and/or integrates the modified CSS (or other files) into the original web content received in step 401. In some cases, the browser extension 124 may regenerate and inject only certain blocks of CSS content into the received CSS files, while in other cases, the browser extension 124 may regenerate and replace entire CSS files.

Further, as indicated by the arrow from step 405 and 402, a web browsing user may make multiple changes to the style/format/layout for the web page, each one causing another dynamic CSS regeneration, injection, and rendering in steps 403-405. However, as noted above these subsequent web page style modifications may be performed with fewer or no requests back to the web server 140 or any other server-side component. For example, in embodiments where the web element definitions are used, they may be initially retrieved from the web server 140 and then stored locally at the client device 110. Then, any number of subsequent web page style modifications may be performed without requiring any communication back to the web server 140 or other server-side systems.

Figure 5:
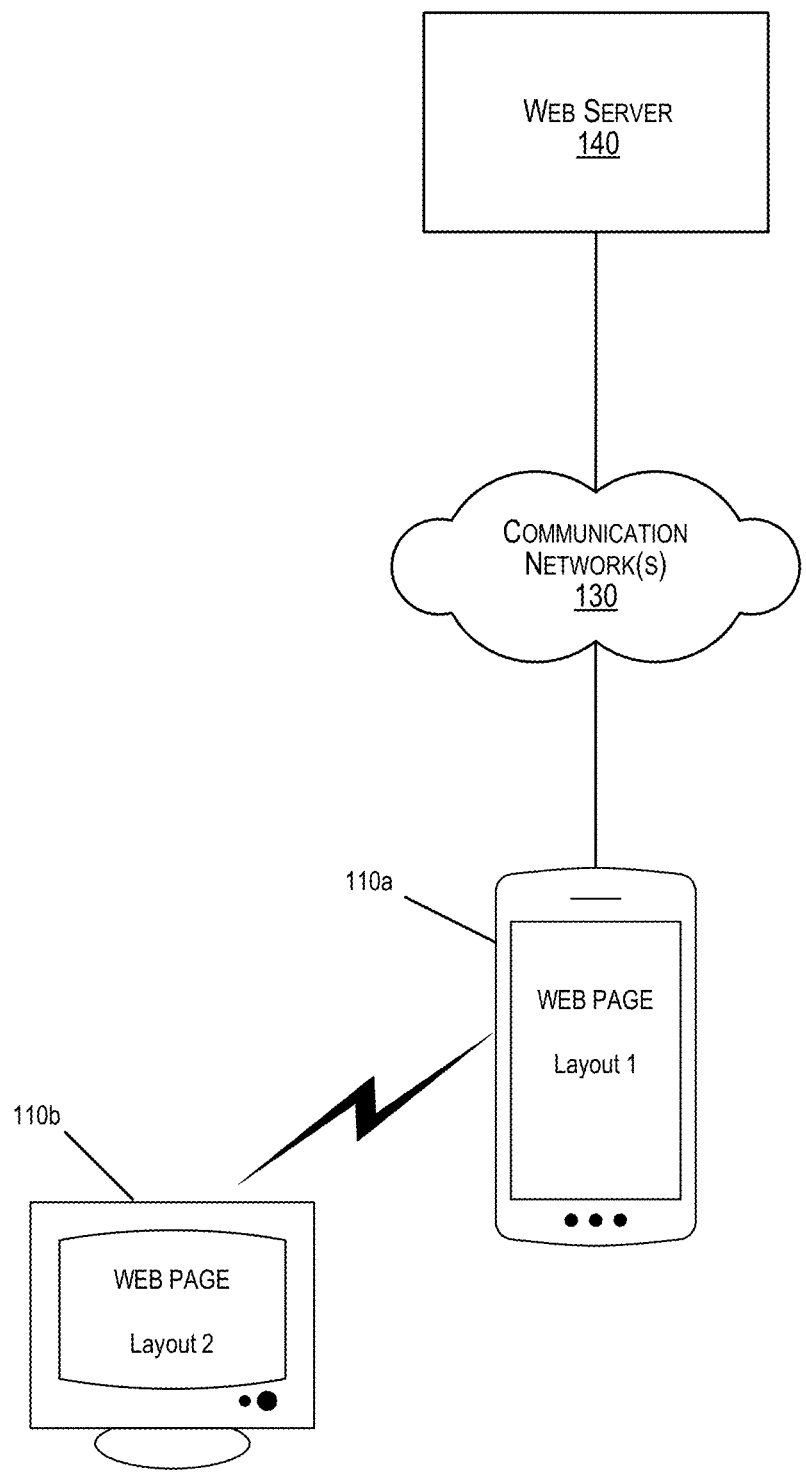
FIG. 5 illustrates a simplified client-server network environment including a web server, client device, and a second display associated with the client device, in accordance with one or more embodiments of the present invention.

Referring now to FIG. 5, another example is shown of a client-server network environment including a web server 140, first client device 110*a*, and a second display device 110*b* in communication with the first client device 110*a*.

Thus, this example may represent one or more possible implementations of the network environment 100 discussed above. In this example, client device 110*a* may correspond to a wireless mobile device such as a smartphone or tablet computer. The client device 110*a* may request and receive web content from the web server 140 and/or other server-side systems, and may support any or all of the functionality discussed above in reference to FIGS. 1-4 for rendering web content, requesting/receiving web element definitions, determining device features, dynamically generating web content, and injecting and rendering updated web content to customize the style, format, and/or layout of the web content for the particular user and/or client device 110*a*. Thus, as described in detail above, the client device 110*a* may include a web browser 122 and/or browser plug-in 124 configured to customize the style/format/layout of the web content displayed on client display 110*a* based on requests from device user, device configuration preferences, and/or the form factor and other characteristics of the client device 110*a*. Further, as discussed above, the client device 110*a* may dynamically generate and render new CSS and other web content to changes the appearance of the displayed web elements/pages, without needing to reload the web page or perform any additional requests/responses to the web server 140 or other server-side systems.

Additionally, as shown in this example, the first client device 110*a* may be connected to or in communication with a second client display 110*b*. Client display 110*b* may be, for example, a television, computer monitor, projection device, or any other display screen. The connection link between the client device 110*a* and the separate display 110*b* may be a wired or wireless connection, and both devices 110*a*-110*b* may support the functionality for the client device 110*a* to transmit its current screen display to the separate display device 110*b* for outputting on that display. Examples of screen mirroring techniques and other similar communication technologies to transmit the screen display from client device 110*a* to display 110*b* may include the Miracast standard, Google Chromecast, AirPlay, and the like. In some cases, the client device 110*a* may transmit its entire screen display, while in other cases it may transmit only a single application window to the separate display device 110*b*. Additionally, in some embodiments, the client device 110*a* and separate display device 110*b* may simultaneously display the identical content, while in other embodiments the content may be displayed on the separate device 110*b* in lieu of being displayed on the first client device 110*a*.

Using a client-server network environment similar to that shown in FIG. 5, additional embodiments may support the dynamic customization of web content by the first client device 110*a*, in order to transmit and render the web content on the separate display device 110*b*. For example, the web browser application 122 and/or browser plug-in 124 operation on the client device 110*a* may be further configured to detect or receive a notification that the display screen is being mirrored or transmitted to a separate display device 110*b*. In some embodiments, the browser plug-in 124 may receive updates/notifications from other software applications or communication components on the phone, to determine that the client device 110*a* is transmitting its screen display to the other display 110*b*, and also to retrieve the form factor and/or other device characteristics of the separate display 110*b*.

Then, in response to detecting that the client device 110*a* is screen mirroring or other sharing its display, it may initiate (automatically or based on a user request) a dynamic generation of updated CSS or other web content, based on the particular device features (e.g., form factor, display or graphics quality, touch screen or input components, etc.) of the target display device 110b. In such cases, the dynamic generation of updated CSS (or other web content), and the injection of the updated CSS into the web content, may be similar or identical to steps 403-404, describe above. However, in these cases, the client device 110a may determine its style, format, and layout configurations based not on the device characteristics of the client device 110a, but instead based on the device characteristics of the separate display 110b. For example, if the form factor of display 110b is much larger and/or shaped differently from the form factor of the display of the client device 110a, then the dynamically generated CSS (or other web content) may be generated by client device 110a specifically for the form factor of the target display 110b. Similarly, the style, format, and layout preferences may be different for the different displays, which respect to the desired color scheme of output, the desired sizes of web elements on the page, the desired text sizes or fonts, the desired text or element spacing, etc., and in each of these cases the client device 110a may dynamically generate the updated CSS (and/or other web content) based on the device characteristics and desired output style/format/layout to be used for the target device 110b.

Thus, in some cases, the client device 110a may dynamically generate and inject a single copy of the modified CSS (and/or web content) based on the characteristics of the target display 110b. However, in other cases, a display sharing feature, screen mirroring feature, or the like operating on the devices 110a-110b may permit the web content to be displayed simultaneously on the client device 110a and the separate display 110b. In these embodiments, the client browser 122 and/or plug-in 124 may be configured to generate and maintain two separate copies of the renderable web content, a first copy to be output to the display of the client device 110a, and a second copy to be output to the separate target display 110b. These two separate copies of the web content need not use identical styles, layouts, or formats for their web elements and web pages. Thus, for example, the client device 110a may perform separate dynamic CSS generation processes, code injection processes, content re-rendering and outputting processes, etc., for each of the two (or more) separate displays. Therefore, even when the identical web page (or any other content) is being displayed by the client device 110a and mirrored to a separate display 110b, the styles, layouts, and formats of the rendered pages or the individual elements therein may be different for the different display devices 110a-110b, based on the two separate dynamic CSS generation processes performed by the client device.

Figure 6:
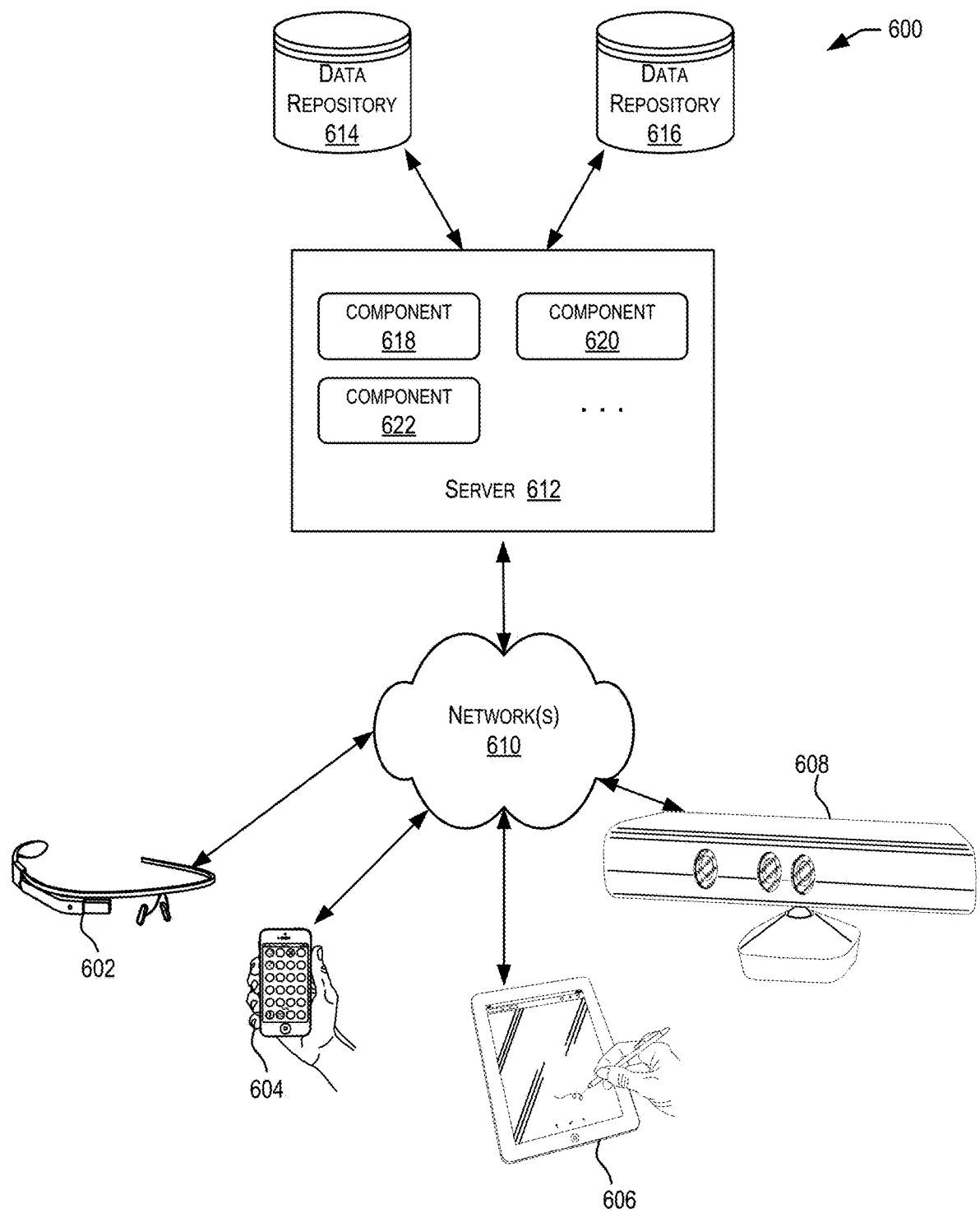
FIG. 6 is a diagram of computer server and computing environment, in accordance with certain embodiments of the present invention.

Referring now to FIG. 6, a simplified diagram is depicted of a distributed system 600 in which the various examples discussed above can be implemented. In the illustrated example, the distributed system 600 includes one or more client computing devices 602, 604, 606, 608, coupled to a server 612 via one or more communication networks 610. The client computing devices 602, 604, 606, 608 may be configured to run one or more applications.

In various embodiments, storage network 612 may be adapted to run one or more services or software applications that enable one or more operations associated with the system 100. For example, users may use the client computing devices 602, 604, 606, 608 (e.g., corresponding to content author device 610) to access one or more cloud-based services provided by via the replication system 600.

In certain examples, the server 612 may also provide other services or software application, and can include non-virtual and virtual environments. In some examples, these services may be offered as web-based or cloud services or under a Software as a Service (SaaS) model to the users of the client computing devices 602, 604, 606, 608. Users operating the client computing devices 602, 604, 606, 608 may in turn use one or more client applications to interact with the server 612 to use the services provided by these components.

In the configuration depicted in FIG. 6, the server 612 may include one or more components 618, 620, 622 that implement the functions performed by the server 612. These components may include software components that may be executed by one or more processors, hardware components, or combinations thereof. It should be appreciated that various different system configurations are possible, which may be different from the example distributed system 600.

The client computing devices 602, 604, 606, 608 may include various types of computing systems, such as portable handheld devices such as smartphones and tablets; general purpose computers such as personal computers and laptops; workstation computers; wearable devices such as a head-mounted display; gaming systems such as handheld gaming devices, gaming consoles, and Internet-enabled gaming devices; thin clients; various messaging devices; sensors and other sensing devices; and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). The client devices may be capable of executing various different applications such as various Internet-related apps, communication applications (e.g., e-mail applications, short message service (SMS) applications) and may use various communication protocols. A client device may provide an interface that enables a user of the client device to interact with the client device. The client device may also output information to the user via this interface. Although FIG. 6 depicts only four client computing devices, any number of client computing devices may be supported.

Network(s) 610 in the distributed system 600 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 610 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 612 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 612 can include one or more virtual machines running virtual operating systems, or other computing architectures involving virtualization, such as one or more flexible pools of logical storage devices that can be virtualized to maintain virtual storage devices for the server. In various examples, the server 612 may be adapted to run one or more services or software applications that perform the operations as described above.

The server 612 may run an operating system including any of those discussed above, as well as any commercially available server operating system. The server 612 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include, without limitation, those commercially available from Oracle, Microsoft, Sybase, IBM (International Business Machines), and the like.

In some implementations, the server 612 may include one or more applications to analyze and consolidate data feeds and/or event updates received from users of the client computing devices 602, 604, 606, 608. As an example, data feeds and/or event updates may include, but are not limited to, Twitter® feeds, Facebook® updates or real-time updates received from one or more third-party information sources and continuous data streams, which may include real-time events related to sensor data applications, financial tickers, network performance measuring tools (e.g., network monitoring and traffic management applications), clickstream analysis tools, automobile traffic monitoring, and the like. The server 612 may also include one or more applications to display the data feeds and/or real-time events via one or more display devices of the client computing devices 602, 604, 606, 608.

The distributed system 600 may also include one or more data repositories 614, 616. These data repositories may provide a mechanism for storing information various types of information, such as the information described by the various examples discussed above. The data repositories 614, 616 may reside in a variety of locations. For example, a data repository used by the server 612 may be local to server 612 or may be remote from server 612 and in communication with server 612 via a network-based or dedicated connection. The data repositories 614, 616 may be of different types. In some examples, a data repository used by the server 612 may be a database, for example, a relational database, such as databases provided by Oracle Corporation® and other vendors. One or more of these databases may be adapted to enable storage, update, and retrieval of data to and from the database in response to SQL-formatted commands.

In some examples, one or more of the data repositories 614, 616 may also be used by applications to store application data. The data repositories used by applications may be of different types such as, for example, a key-value store repository, an object store repository, or a general storage repository supported by a file system.

Figure 7:
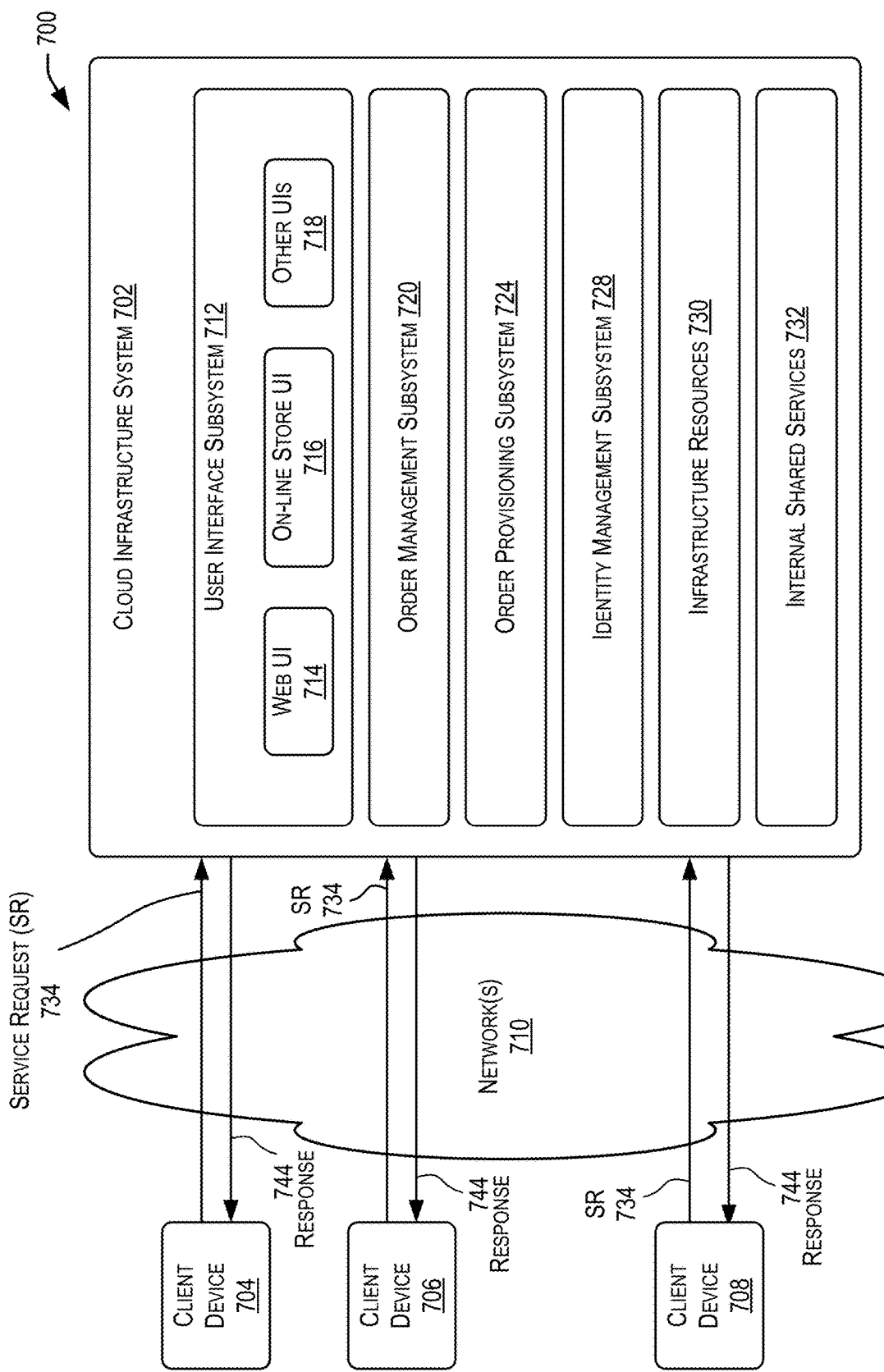
FIG. 7 is a simplified block diagram depicting components of a cloud computing system and environment, in accordance with certain embodiments of the present invention.

In some examples, a cloud environment may provide one or more services such as those discussed above. Referring now to FIG. 7, a simplified block diagram is shown of one or more components of a system environment 700 in which these and other services can be offered as cloud services. In the example illustrated in in FIG. 7, a cloud infrastructure system 702 may provide one or more cloud services that may be requested by users using one or more client computing devices 704, 706, and 708. The cloud infrastructure system 702 may include one or more computers and/or servers that may include those described above for server 612 of FIG. 6. The computers in cloud infrastructure system 702 of FIG. 7 may be organized as general purpose computers, specialized server computers, server farms, server clusters, or any other appropriate arrangement and/or combination.

Network(s) 710 may facilitate communication and exchange of data between the clients 704, 706, 708 and the cloud infrastructure system 702. The network(s) 710 may include one or more networks. The networks may be of the same or different types. The network(s) 710 may support one or more communication protocols, including wired and/or wireless protocols, for facilitating the communications.

The example depicted in FIG. 7 is only one example of a cloud infrastructure system and is not intended to be limiting. It should be appreciated that, in other examples, the cloud infrastructure system 702 may have more or fewer components than those depicted in FIG. 7, may combine two or more components, or may have a different configuration or arrangement of components. For example, although FIG. 7 depicts three client computing devices, any number of client computing devices may be supported in other examples.

The term cloud service is generally used to refer to a service that is made available to users on demand and via a communication network such as the Internet by systems (e.g., the cloud infrastructure system 702) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand and self-service, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In various examples, the cloud infrastructure system 702 may provide one or more cloud services using different models, such as under a Software as a Service (SaaS) model, a Platform as a Service (PaaS) model, an Infrastructure as a Service (IaaS) model, and others, including hybrid service models. The cloud infrastructure system 702 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by the cloud infrastructure system 702. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

In some examples, resources in the cloud infrastructure system 702 may be shared by multiple users and dynamically re-allocated per demand. Additionally, resources may be allocated to users in different time zones. For example, the cloud infrastructure system 702 may enable a first set of users in a first time zone to utilize resources of the cloud infrastructure system for a specified number of hours and then enable the re-allocation of the same resources to another set of users located in a different time zone, thereby maximizing the utilization of resources.

The cloud infrastructure system 702 may provide the cloud services via different deployment models. In a public cloud model, the cloud infrastructure system 702 may be owned by a third party cloud services provider and the cloud services are offered to any general public customer, where the customer can be an individual or an enterprise. In certain other embodiments, under a private cloud model, the cloud infrastructure system 702 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 702 and the services provided may be shared by several organizations in a related community. Various other models such as hybrids of the above mentioned models may also be used.

The client computing devices 704, 706, 708 may be devices similar to those described above for the client computing devices 602, 604, 606, 608 of FIG. 6. The client computing devices 704, 706, 708 of FIG. 7 may be configured to operate a client application such as a web browser, a proprietary client application (e.g., Oracle Forms), or some other application, which may be used by a user of the client computing device to interact with the cloud infrastructure system 702 to use services provided by the cloud infrastructure system 702.

In various examples, the cloud infrastructure system 702 may also provide "big data" and related computation and analysis services. The term "big data" is generally used to refer to extremely large data sets that can be stored and manipulated by analysts and researchers to visualize large amounts of data, detect trends, and/or otherwise interact with the data. The analysis the cloud infrastructure system 702 can perform may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 7, cloud infrastructure system 702 may include infrastructure resources 730 that are used for facilitating the provision of various cloud services offered by cloud infrastructure system 702. Infrastructure resources 730 may include, for example, processing resources, storage or memory resources, networking resources, and the like.

In some examples, to facilitate efficient provisioning of these resources for supporting the various cloud services provided by cloud infrastructure system 702 for different customers, the resources may be bundled into sets of resources or resource modules (also referred to as "pods"). Each resource module or pod may comprise a pre-integrated and optimized combination of resources of one or more types. In some examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

The cloud infrastructure system 702 may itself internally use the services 732 that are shared by different components of cloud infrastructure system 702 and which facilitate the provisioning of services by cloud infrastructure system 702. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various examples, the cloud infrastructure system 702 may include multiple subsystems. These subsystems may be implemented in software, or hardware, or combinations thereof. As depicted in FIG. 7, the subsystems may include a user interface subsystem w that enables users or customers of cloud infrastructure system 702 to interact with cloud infrastructure system 702. The user interface subsystem 712 may include various different interfaces such as a web interface 714, an online store interface 716 where cloud services provided by cloud infrastructure system 702 are advertised and are purchasable by a consumer, and other interfaces 718. For example, a customer may, using a client device, request (service request 734) one or more services provided by cloud infrastructure system 702 using one or more of interfaces 714, 716, 718. For example, a customer may access the online store, browse cloud services offered by cloud infrastructure system 702, and place a subscription order for one or more services offered by cloud infrastructure system 702 that the customer wishes to subscribe to. The service request may include information identifying the customer and one or more services that the customer desires to subscribe to. For example, a customer may place a subscription order for services such as those discussed above. As part of the order, the customer may provide information identifying the amount of resources the customer needs and/or for what time frame, among other things.

In some examples, such as the example depicted in FIG. 7, the cloud infrastructure system 702 may include an order management subsystem (OMS) 720 that is configured to process the new order. As part of this processing, OMS 720 may be configured to: generate an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning, among other operations.

Once properly validated, OMS 720 may then invoke the order provisioning subsystem (OPS) 724 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 724 may be configured to determine the particular cloud service being requested and identify a number of pods that may have been pre-configured for that particular cloud service. The number of pods that are allocated for an order may depend upon the size/amount/level/ scope of the requested service. For example, the number of pods to be allocated may be determined based upon the number of users to be supported by the service, the duration of time for which the service is being requested, and the like. The allocated pods may then be customized for the particular requesting customer for providing the requested service.

The cloud infrastructure system 702 may send a response or notification 744 to the requesting customer to indicate when the requested service is now ready for use. In some instances, information (e.g., a link) may be sent to the customer that enables the customer to start using and availing the benefits of the requested services.

The cloud infrastructure system 702 may provide services to multiple customers. For each customer, the cloud infrastructure system 702 is responsible for managing information related to one or more subscription orders received from the customer, maintaining customer data related to the orders, and providing the requested services to the customer. The cloud infrastructure system 702 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

The cloud infrastructure system 702 may provide services to multiple customers in parallel. The cloud infrastructure system 702 may store information for these customers, including possibly proprietary information. In some examples, the cloud infrastructure system 702 includes an identity management subsystem (IMS) 728 that is configured to manage customer-specific information and provide the separation of the managed information such that information related to one customer is not accessible by another customer. IMS 728 may be configured to provide various security-related services such as identity services, such as information access management, authentication and authorization services, services for managing customer identities and roles and related capabilities, and the like.

Figure 8:
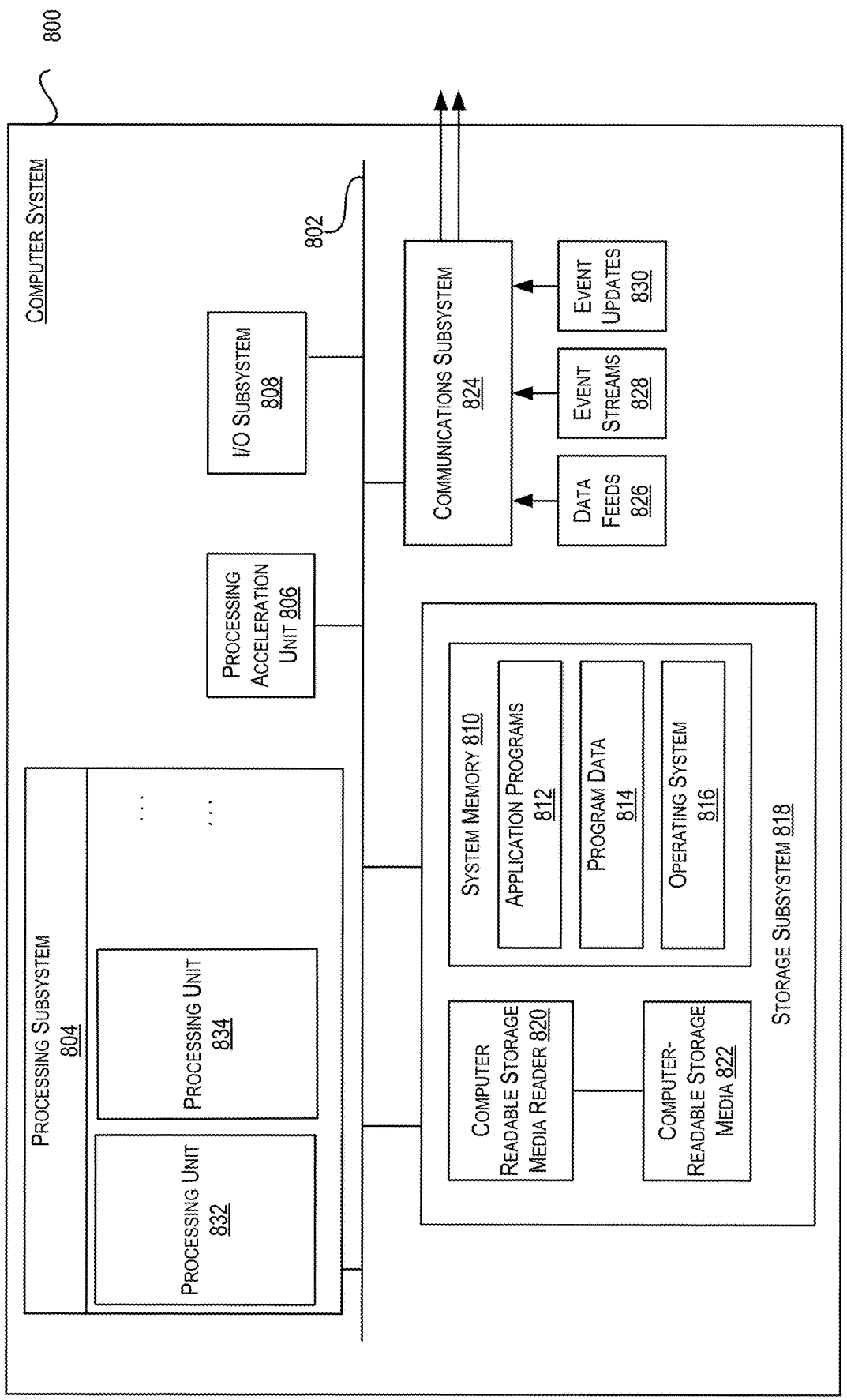
FIG. 8 is a schematic illustration of a computer system configured to perform techniques in accordance with certain embodiments of the present invention.

Referring now to FIG. 8, an example is shown of a computer system 800 that may be used to implement the various examples discussed above. In some examples, the computer system 800 may be used to implement any of the various servers and computer systems described above. As shown in FIG. 8, the computer system 800 includes various subsystems including a processing subsystem 804 that communicates with a number of other subsystems via a bus subsystem 802. These other subsystems may include a processing acceleration unit 806, an I/O subsystem 808, a storage subsystem 818 and a communications subsystem 824. The storage subsystem 818 may include non-transitory computer-readable storage media 822 and a system memory 810.

The bus subsystem 802 provides a mechanism for letting the various components and subsystems of the computer system 800 communicate with each other as intended. Although the bus subsystem 802 is shown schematically as a single bus, alternate examples of the bus subsystem may utilize multiple buses. The bus subsystem 802 may be any of several types of bus structures including a memory bus or memory controller, a peripheral bus, a network bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like. It may also utilize networking based architecture such as sockets, pipes, TCP/IP, wired or wireless, local, virtual, cellular and others.

The processing subsystem 804 controls the operation of the computer system 800 and may comprise one or more processors, application specific integrated circuits (ASICs), or field programmable gate arrays (FPGAs). The processors may include be single core or multi-core processors. The processing resources of computer system 800 can be organized into one or more processing units 832, 834. A processing unit may include one or more processors, including single core or multi-core processors, one or more cores from the same or different processors, a combination of cores and processors, or other combinations of cores and processors. In some examples, the processing subsystem 804 can include one or more special purpose co-processors such as graphics processors, digital signal processors (DSPs), or the like. In some examples, some or all of the processing units of the processing subsystem 804 can be implemented using customized circuits, such as application specific integrated circuits (ASICs), or field programmable gate arrays (FPGAs).

In some examples, the processing units in the processing subsystem 804 can execute instructions stored in the system memory 810 or on the computer readable storage media 822. In various examples, the processing units can execute a variety of programs or code instructions and can maintain multiple concurrently executing programs or processes. At any given time, some or all of the program code to be executed can be resident in the system memory 810 and/or on the computer-readable storage media 822 including potentially on one or more storage devices. Through suitable programming, the processing subsystem 804 can provide various functionalities described above. In instances where computer system 800 is executing one or more virtual machines, one or more processing units may be allocated to each virtual machine In some examples, a processing acceleration unit 806 may be provided for performing customized processing or for off-loading some of the processing performed by the processing subsystem 804 so as to accelerate the overall processing performed by the computer system 800.

The I/O subsystem 808 may include devices and mechanisms for inputting information to the computer system 800 and/or for outputting information from or via the computer system 800. In general, use of the term "input device" is intended to include all possible types of devices and mechanisms for inputting information to the computer system 800. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 800 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 818 provides a repository or data store for storing information that is used by the computer system 800. The storage subsystem 818 provides a tangible non-transitory computer-readable storage medium for storing the basic programming and data constructs that provide the functionality of some examples. Software (e.g., programs, code modules, instructions) that when executed by the processing subsystem 804 provide the functionality described above may be stored in the storage subsystem 818. The software may be executed by one or more processing units of the processing subsystem 804. The storage subsystem 818 may also provide a repository for storing data used in accordance with the present disclosure.

The storage subsystem 818 may include one or more non-transitory memory devices, including volatile and non-volatile memory devices. As shown in FIG. 8, the storage subsystem 818 includes a system memory 810 and a computer-readable storage media 822. The system memory 810 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 800, such as during start-up, may typically be stored in the ROM. The RAM typically contains data and/or program modules that are presently being operated and executed by the processing subsystem 804. In some implementations, the system memory 810 may include multiple different types of memory, such as static random access memory (SRAM) or dynamic random access memory (DRAM), and the like.

By way of example, and not limitation, as depicted in FIG. 8, the system memory 810 may load application programs 812 that are being executed, which may include client applications, Web browsers, mid-tier applications, relational database management systems (RDBMS), etc., program data 811, and an operating system 816. By way of example, the operating system 816 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

The computer-readable storage media 822 may store programming and data constructs that provide the functionality of some examples. The computer-readable media 822 may provide storage of computer-readable instructions, data structures, program modules, and other data for the computer system 800. Software (programs, code modules, instructions) that when executed by the processing subsystem 804 provides the functionality described above that may be stored in the storage subsystem 818. By way of example, the computer-readable storage media 822 may include non-volatile memory such as a hard disk drive, a magnetic disk drive, an optical disk drive such as a CD ROM, DVD, a Blu-Ray® disk, or other optical media. The computer-readable storage media 822 may include, but is not limited to, Zip® drives, flash memory cards, universal serial bus (USB) flash drives, secure digital (SD) cards, DVD disks, digital video tape, and the like. Computer-readable storage media 822 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The computer-readable storage media 822 may provide storage of computer-readable instructions, data structures, program modules, and other data for the computer system 800.

In some examples, the storage subsystem 818 may also include a computer-readable storage media reader 820 that can further be connected to the computer-readable storage media 822. The reader 820 may receive and be configured to read data from a memory device such as a disk, a flash driver, etc.

In some examples, the computer system 800 may support virtualization technologies, including but not limited to virtualization of processing and memory resources. For example, the computer system 800 may provide support for executing one or more virtual machines. The computer system 800 may execute a program such as a hypervisor that facilitates the configuring and managing of the virtual machines. Each virtual machine generally runs independently of the other virtual machines. A virtual machine may be allocated memory, compute (e.g., processors, cores), I/O, and networking resources. Each virtual machine typically runs its own operating system, which may be the same as or different from the operating systems executed by other virtual machines executed by the computer system 800. Accordingly, multiple operating systems may potentially be run concurrently by the computer system 800.

The communications subsystem 824 provides an interface to other computer systems and networks. The communications subsystem 824 serves as an interface for receiving data from and transmitting data to other systems from the computer system 800. For example, the communications subsystem 824 may enable the computer system 800 to establish a communication channel to one or more client computing devices via the Internet for receiving and sending information from and to the client computing devices.

The communication subsystem 824 may support both wired and/or wireless communication protocols. For example, in some examples, the communications subsystem 824 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples, the communications subsystem 824 can provide wired network connectivity (e.g., Ethernet) in addition to or instead of a wireless interface.

The communication subsystem 824 can receive and transmit data in various forms. For example, in some examples, the communications subsystem 824 may receive input communication in the form of structured and/or unstructured data feeds 826, event streams 828, event updates 830, and the like. For example, the communications subsystem 824 may be configured to receive (or send) data feeds 826 in real-time from users of social media networks and/or other communication services such as Twitter® feeds, Facebook® updates, web feeds such as Rich Site Summary (RSS) feeds, and/or real-time updates from one or more third party information sources.

In some examples, the communications subsystem 824 may be configured to receive data in the form of continuous data streams, which may include event streams 828 of real-time events and/or event updates 830, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

The communications subsystem 824 may also be configured to output the structured and/or unstructured data feeds 826, event streams 828, event updates 830, and the like to one or more databases that may be in communication with one or more streaming data source computers coupled to the computer system 800.

The computer system 800 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of the computer system 800 depicted in FIG. 8 is intended only as a specific example. Many other configurations having more or fewer components than the system depicted in FIG. 8 are possible. Based on the disclosure and teachings provided herein, a person of ordinary skill in the art will appreciate other ways and/or methods to implement the various examples.

Although specific implementations have been described, various modifications, alterations, alternative constructions, and equivalents are possible. Implementations described in the present disclosure are not restricted to operation within certain specific data processing environments, but are free to operate within a plurality of data processing environments. Additionally, although implementations have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described implementations may be used individually or jointly.

Further, while implementations described in the present disclosure have been described using a particular combination of hardware and software, it should be recognized that other combinations of hardware and software are also possible. Some implementations described herein may be implemented only in hardware, or only in software, or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation, such as by executing computer instructions or code, or processors or cores programmed to execute code or instructions stored on a non-transitory memory medium, or any combination thereof. Processes can communicate using a variety of techniques including, but not limited to, conventional techniques for inter-process communication, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope of the disclosure. Thus, although specific implementations have been described, these are not intended to be limiting; various modifications and equivalents are within the scope of the disclosure.

What is claimed is:

1. A method of rendering web content on a client device, comprising:
    transmitting, by a client device executing a web browser, a first request to a web server, the first request identifying web content;
    receiving, by the client device and from the web server, one or more web-based resources for rendering the web content requested by the client device, wherein the one or more web-based resources include a first markup language document that specifies a first visual representation of the web content;
    analyzing, by the client device, the one or more web-based resources to identify one or more web elements within the web content;
    determining, by the client device, an element identifier for each of the one or more web elements, based on the analysis of the one or more web-based resources;
    transmitting, by the client device, a second request to the web server, the second request including the element identifier determined for each of the one or more web elements;
    receiving, by the client device, in response to the second request, a web element definition for each of the one or more web elements, wherein the web element definition specifies a range of size values for the web element;
    for each web element of the one or more web elements:
        determining, by the client device, a size value from the range specified in the web element definition of the web element, wherein the value is determined by the client device based on device characteristics that correspond to the client device; and
        generating, by the client device, a modified web element corresponding to the web element, the modified web element having a size that corresponds to the determined size value;
    generating, by the client device, a second markup language document that specifies a second visual representation of the web content, wherein the second markup language document includes one or more modified web elements;
    replacing the first markup language document with the second markup language document; and
    using, by the client device, at least the second markup language document to render the web content to a display of the client device.

2. The method of rendering web content on a client device of claim 1, wherein generating the second markup language document by the client device comprises:
    generating an updated cascading style sheet (CSS), wherein the updated cascading style sheet is based on (i) one or more cascading style sheets previously received from the web server in response to the first request, and (ii) the one or more web element definitions received from the web server in response to the second request.

3. The method of rendering web content on a client device of claim 1, wherein a first web element within the web content is a table comprising a first number of rows and second number of columns, and wherein the received web element definition for the first web element identifies at least one of: an updated number of rows different than the first number, or an updated number of columns different than the second number.

4. The method of rendering web content on a client device of claim 1, wherein receiving the web element definitions for each of the one or more web elements, in response to the second request, comprises:
    receiving, for a first web element, a first web element definition that defines at least one of a pixel requirement or a style requirement for the first web element.

5. The method of rendering web content on a client device of claim 1, further comprising:
    determining, by the web browser executing on the client device, a form factor of the display of the client device,
    wherein the second markup language document is based on the determined form factor of the display of the client device.

6. The method of rendering web content on a client device of claim 5, further comprising, after rendering the web content to the display of the client device:
    detecting, by the client device, that a connection has been established between the client device and a second display;
    determining, by the web browser executing on the client device, a second form factor of the second display connected to the client device;
    generating, by the client device, a third markup language document that specifies a third visual representation of the web content, wherein the generation of the third markup language document is performed based on the second form factor of the second display connected to the client device; and
    using, by the client device, the third markup language document to render the web content to the second display connected to the client device.

7. The method of rendering web content on a client device of claim 5, further comprising:
    determining, by the web browser executing on the client device, one or more functional device capabilities of the client device;
    wherein the second markup language document is generated based on the determined functional device capabilities of the client device.

8. The method of rendering web content on a client device of claim 1, wherein analyzing the web content received from the web server in response to the first request comprises:
    determining, for each particular web element of a plurality of web elements within the web content: (i) an element identifier, (ii) a pixel value associated with the particular web element, and (iii) one or more properties of the particular web element, and (iv) one or more style values associated with the particular web element.

9. A client computing device, comprising:
    one or more network interfaces configured to access a wide-area network (WAN);
    one or more integrated or associated display devices configured to output graphical content;
    a processing unit comprising one or more processors;
    a memory storing a set of computer-readable instructions, which when executed by the one or more processors, causes the client computing device to:

transmit, via a web browser executing on the client computing device, a first request to a web server, the first request identifying web content;

receive, from the web server, one or more web-based resources for rendering the web content requested by the client computing device, wherein the one or more web-based resources include a first markup language document that specifies a first visual representation of the web content;

analyze the one or more web-based resources to identify one or more web elements within the web content;

determine an element identifier for each of the one or more web elements, based on the analysis of the one or more web-based resources;

transmit a second request to the web server, the second request including the element identifier determined for each of the one or more web elements;

receive, in response to the second request, a web element definition for each of the one or more web elements, wherein the web element definition specifies a range of size values for the web element;

for each web element of the one or more web elements:
  determine a size value from the range specified in the web element definition of the web element, wherein the value is determined by the client device based on device characteristics that correspond to the client device; and
  generate a modified web element corresponding to the web element, the modified web element having a size that corresponds to the determined size value;

generate a second markup language document that specifies a second visual representation of the web content, wherein the second markup language document includes one or more modified web elements;

replace the first markup language document with the second markup language document; and use at least the second markup language document to render the web content to the one or more display devices integrated or associated with the client computing device.

10. The client computing device of claim 9, wherein generating the second markup language document comprises:
  generating an updated cascading style sheet (CSS), wherein the updated cascading style sheet is based on (i) one or more cascading style sheets previously received from the web server in response to the first request, and (ii) the one or more web element definitions received from the web server in response to the second request.

11. The client computing device of claim 9, wherein a first web element within the web content is a table comprising a first number of rows and second number of columns, and wherein the received web element definition for the first web element identifies at least one of: an updated number of rows different than the first number, or an updated number of columns different than the second number.

12. The client computing device of claim 9, wherein receiving the web element definitions for each of the one or more web elements, in response to the second request, comprises:
  receiving, for a first web element, a first web element definition that defines at least one of a pixel requirement or a style requirement for the first web element.

13. The client computing device of claim 9, the memory storing additional computer-readable instructions, which when executed by the one or more processors, further causes the client computing device to:
  determine, by the web browser executing on the client computing device, a form factor of a first display device integrated or associated with the client computing device,
  wherein the second markup language document is based on the determined form factor of the first display device.

14. The client computing device of claim 13, the memory storing additional computer-readable instructions, which when executed by the one or more processors, further causes the client computing device to:
  detect, after the rendering of the web content, that a connection has been established between the client computing device and a second display device;
  determine, by the web browser executing on the client computing device, a second form factor of the second display device connected to the client computing device;
  generate a third markup language document that specifies a third visual representation of the web content, wherein the generation of the third markup language document is performed based on the second form factor of the second display device connected to the client computing device; and
  use the third markup language document to render the web content to the second display device connected to the client computing device.

15. The client computing device of claim 13, the memory storing additional computer-readable instructions, which when executed by the one or more processors, further causes the client computing device to:
  determine, by the web browser executing on the client computing device, one or more functional device capabilities of the client computing device;
  wherein the second markup language document is generated based on the determined functional device capabilities of the client computing device.

16. The client computing device of claim 9, wherein analyzing the web content received from the web server in response to the first request comprises:
  determining, for each particular web element of a plurality of web elements within the web content: (i) an element identifier, (ii) a pixel value associated with the particular web element, and (iii) one or more properties of the particular web element, and (iv) one or more style values associated with the particular web element.

17. A non-transitory computer-readable medium comprising instructions which, when executed by one or more processors of a client computing device, causes the one or more processors to render web content on the client computing device, the instructions comprising:
  transmitting, via a web browser executing on the client computing device, a first request to a web server, the first request identifying web content;
  receiving, from the web server, one or more web-based resources for rendering the web content requested by the client computing device, wherein the one or more web-based resources include a first markup language document that specifies a first visual representation of the web content;
  analyzing the one or more web-based resources to identify one or more web elements within the web content;

determining an element identifier for each of the one or more web elements, based on the analysis of the one or more web-based resources;

transmitting a second request to the web server, the second request including the element identifier determined for each of the one or more web elements;

receiving, in response to the second request, a web element definition for each of the one or more web elements, wherein the web element definition specifies a range of size values for the web element;

for each web element of the one or more web elements:
determining a size value from the range specified in the web element definition of the web element, wherein the value is determined by the client device based on device characteristics that correspond to the client device; and
generating a modified web element corresponding to the web element, the modified web element having a size that corresponds to the determined size value;

generating a second markup language document that specifies a second visual representation of the web content, wherein the second markup language document includes one or more modified web elements;

replacing the first markup language document with the second markup language document; and using at least the second markup language document to render the web content to a first display device integrated or associated with the client computing device.

18. The non-transitory computer-readable medium of claim 17, the instructions further comprising:

determining, by the web browser executing on the client computing device, a form factor of the first display device integrated or associated with the client computing device, wherein the second markup language document is based on the determined form factor of the first display device.

19. The non-transitory computer-readable medium of claim 18, the instructions further comprising:

detecting, after the rendering of the web content, that a connection has been established between the client computing device and a second display device;

determining, by the web browser executing on the client computing device, a second form factor of the second display device connected to the client computing device;

generating a third markup language document that specifies a third visual representation of the web content, wherein the generation of the third markup language document is performed based on the second form factor of the second display device connected to the client computing device; and using the third markup language document to render the web content to the second display device connected to the client computing device.

20. The non-transitory computer-readable medium of claim 18, the instructions further comprising:

determining, by the web browser executing on the client computing device, one or more functional device capabilities of the client computing device;

wherein the second markup language document is generated based on the determined functional device capabilities of the client computing device.

* * * * *